(12) United States Patent
Braverman et al.

(10) Patent No.: US 7,454,789 B2
(45) Date of Patent: Nov. 18, 2008

(54) SYSTEMS AND METHODS FOR PROCESSING MESSAGE ATTACHMENTS

(75) Inventors: Matthew I Braverman, Redmond, WA (US); Omar H Shahine, San Francisco, CA (US); Gil Gordon, San Mateo, CA (US)

(73) Assignee: Microsoft Corporation, Redmond, WA (US)

(*) Notice: Subject to any disclaimer, the term of this patent is extended or adjusted under 35 U.S.C. 154(b) by 702 days.

(21) Appl. No.: 11/080,377

(22) Filed: Mar. 15, 2005

(65) Prior Publication Data

US 2006/0212712 A1   Sep. 21, 2006

(51) Int. Cl.
*G06F 11/00* (2006.01)

(52) U.S. Cl. .......................................... 726/22; 726/24

(58) Field of Classification Search ............. 726/22–24; 713/160–162, 165, 170, 181
See application file for complete search history.

(56) References Cited

U.S. PATENT DOCUMENTS 5,699,517 A * 12/1997 Yamasaki .................... 709/203
2004/0128355 A1* 7/2004 Chao et al. .................. 709/206

* cited by examiner

*Primary Examiner*—Hosuk Song
(74) *Attorney, Agent, or Firm*—Lee & Hayes, PLLC (57) ABSTRACT

Message attachment processing is described. In an implementation, a method is described in which each of a plurality of message attachments are processed to generate a corresponding unique identifier such that each message attachment that matches, one to another, has a matching unique identifier. A determination is then made whether a number of matching unique identifiers exceeds a threshold, and if so, a corresponding message attachment is communicated for further processing.

14 Claims, 5 Drawing Sheets

302 Process Each of a Plurality Message Attachments to Generate a corresponding Unique Identifier such that each Matching Message Attachment has a Matching Unique Identifier

308 Determine if a Number of Matching Unique Identifiers exceeds a Threshold, and if so, Communicate a Corresponding Message Attachment for Further Processing

310 Antivirus Service Generates a Virus Cure Based on the Message Attachment

312 Virus Cure Distributed to the Plurality of Clients

SYSTEMS AND METHODS FOR PROCESSING MESSAGE ATTACHMENTS

TECHNICAL FIELD

The present invention generally relates to messages and more particularly relates to message attachment processing.

BACKGROUND

Billions of messages are communicated each day between many different users from a variety of locations. For example, users may exchange emails to communicate messages that include text, graphics, files, and so on over the Internet. Therefore, users may be located in different offices and even on different continents and communicate emails between each other.

In another example, users may exchange instant messages in an instant messaging session. For instance, when two users are online at the same time, instant messages may be exchanged in real time between the two users. In this way, the instant messages may be utilized to support a text conversation between the two users in a manner that mimics how the two users would participate in a typical spoken conversation. During the instant messaging session, users may communicate additional information that is attached to the message, such as emoticons, executable files that provide a moving display of graphics, and so on.

Malicious parties, however, may utilize message attachments to spread malicious computer code, which is commonly referred to as computer viruses. A computer virus, for instance, may be configured as an executable file that is designed to replicate itself. For example, a computer virus may disguise itself as a legitimate program such that a user will select the seemingly legitimate program. This selection may cause the spread of the computer virus on the user's computing device, as well as to other computing devices.

Therefore, there is a continuing need for techniques for processing message attachments, such as to identify computer viruses.

SUMMARY

Message attachment processing is described. In an implementation, a method is described in which each of a plurality of message attachments are processed to generate a corresponding unique identifier such that each message attachment that matches, one to another, has a matching unique identifier. A determination is then made as to whether a number of matching unique identifiers exceeds a threshold, and if so, a corresponding message attachment is communicated for further processing. The further processing may be performed to achieve a variety of functionality. For example, the further processing may utilize heuristics to further determine if the message attachment is a computer virus. In a further example, the further processing may be performed to arrive at a cure for the computer virus.

BRIEF DESCRIPTION OF THE DRAWINGS

The same reference numbers are utilized in instances in the discussion to reference like structures and components.

DETAILED DESCRIPTION

Overview

Systems and methods for processing message attachments are described. Computer viruses (e.g., "Trojans", "worms", and other malicious computer code) are frequently transmitted as attachments to messages. Further, computer viruses (also referred to hereafter as "viruses") are often rewritten and adjusted to defeat detection. Therefore, it may be difficult to identify a new email virus which may result in a delay in how long it takes to find a cure for the virus. This delay may exacerbate the effect of the virus, as more and more computing devices become infected, thereby resulting in a great amount of harm to a large number of users.

In an implementation, a system is described in which message attachments are processed to detect "suspicious" message attachments. For example, an email provider may process a large volume of email. Therefore, the email provider may execute one or more modules to examine message attachments communicated via the email provider to identify possible computer viruses that are new and previously unidentified. For example, the email provider may utilize a variety of heuristics to identify when a particular email attachment is a virus. For instance, the email provider may process the message attachments to track how many of a particular message attachment are communicated via the email provider. Factors may be utilized to determine whether a message attachment is potentially a computer virus. For example, the factors may include a number of occurrences of the particular message attachment that are communicated, a number of computing devices which communicate the message attachment, a number of computing devices that are to receive the email attachment from each computing device, and so on.

Potential viruses may be collected, stripped of personally identifiable information, and then made available for examination by an antivirus service. Thus, the large volume of email processed by the email provider may provide for early detection of the computer virus, thereby providing an earlier opportunity to provide a cure for the virus and limit its spread. In the following discussion, an exemplary environment is first described which is operable to employ message attachment processing techniques. Exemplary procedures are then described which are operable in the described exemplary environment, as well as in other environments.

Exemplary Environment

Figure 1:
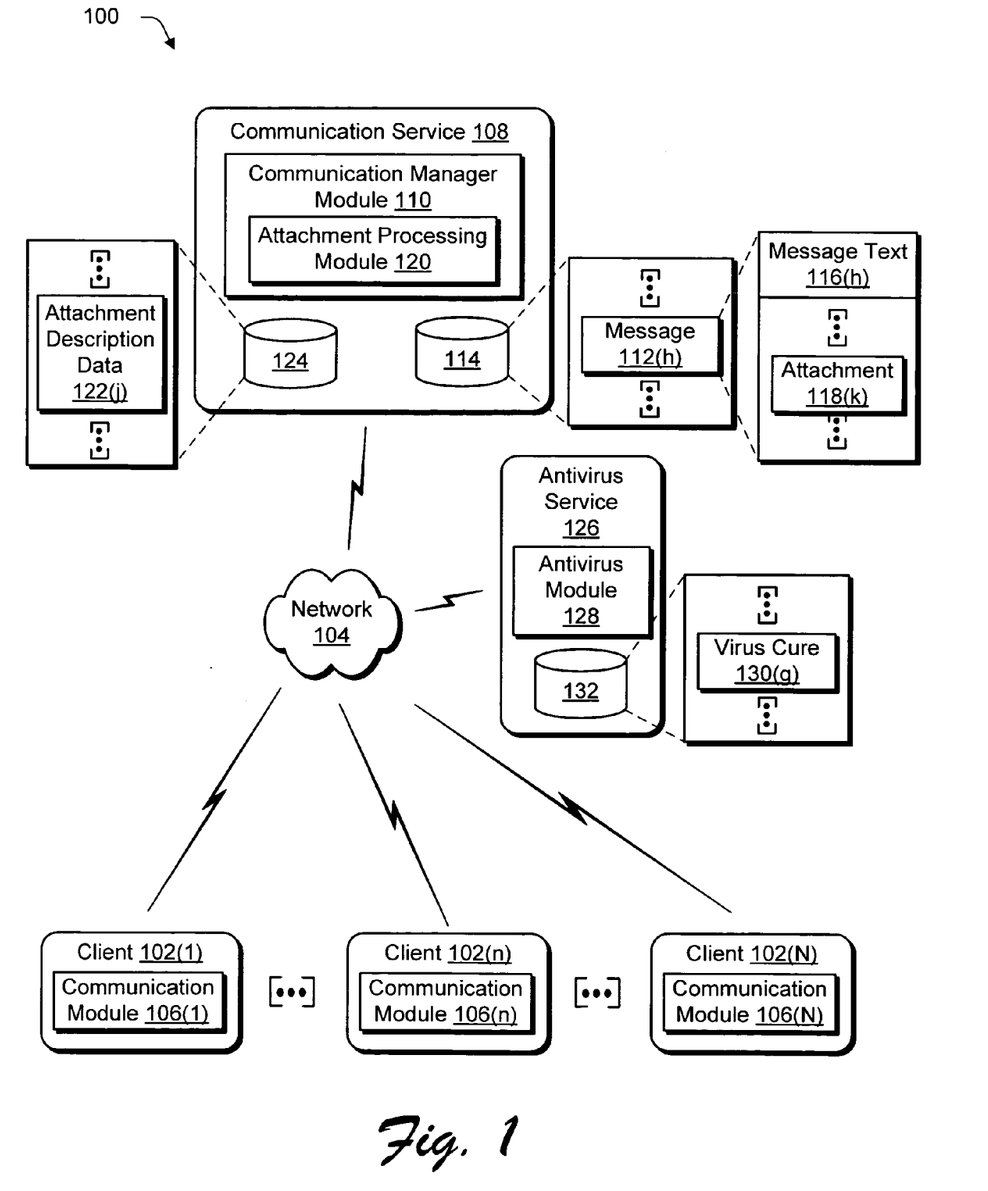
FIG. 1 is an illustration of an environment operable for communication of messages across a network.

FIG. 1 is an illustration of an environment 100 operable for communication of messages across a network. The environment 100 is illustrated as including a plurality of clients 102(1), ..., 102(n), ..., 102(N) that are communicatively coupled, one to another, over a network 104. The plurality of clients 102(1)-102(N) may be configured in a variety of ways. For example, one or more of the clients 102(1)-102(N) may be configured as a computing device that is capable of communicating over the network 104, such as a desktop computer, a mobile station, a game console, an entertainment appliance, a set-top box communicatively coupled to a display device, a wireless phone, and so forth. The clients 102(1)-102(N) may range from full resource devices with substantial memory and processor resources (e.g., personal computers, television recorders equipped with hard disk) to low-resource devices with limited memory and/or processing resources (e.g., traditional set-top boxes). In the following discussion, the clients 102(1)-102(N) may also relate to a person and/or entity that operate the client. In other words, client 102(1)-102(N) may describe a logical client that includes a user, software and/or a machine.

Additionally, although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks. For instance, clients 102(1), 102(n) may be communicatively coupled via a peer-to-peer network to communicate, one to another. Each of the clients 102(1), 102(n) may also be communicatively coupled to client 102(N) over the Internet. In another instance, the clients 102(1), 102(n) are communicatively coupled via an intranet to communicate, one to another. Each of the clients 102(1), 102(n) in this other instance is also communicatively coupled via a gateway to access client 102(N) over the Internet.

Each of the plurality of clients 102(1)-102(N) is illustrated as including a respective one of a plurality of communication modules 106(1), ..., 106(n), ..., 106(N). In the illustrated implementation, each of the plurality of communication modules 106(1)-106(N) is executable on a respective one of the plurality of clients 102(1)-102(N) to send and receive messages. For example, one or more of the communication modules 106(1)-106(N) may be configured to send and receive email. As previously described, email employs standards and conventions for addressing and routing such that the email may be delivered across the network 104 utilizing a plurality of devices, such as routers, other computing devices (e.g., email servers), and so on. In this way, emails may be transferred within a company over an intranet, across the world using the Internet, and so on. An email, for instance, may include a header, text, and attachments, such as documents, computer-executable files, and so on. The header contains technical information about the source and oftentimes may describe the route the message took from sender to recipient.

In another example, one or more of the communication modules 106(1)-106(N) may be configured to send and receive instant messages. Instant messaging provides a mechanism such that each of the clients 102(1)-102(N), when participating in an instant messaging session, may send text messages to each other. The instant messages may also include attachments, such as emoticons, music files, pictures, and so on. The instant messages are typically communicated in real time, although delayed delivery may also be utilized, such as by logging the text messages when one of the clients 102(1)-102(N) is unavailable, e.g., offline. Thus, instant messaging may be though of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received.

In an implementation, the communication modules 106(1)-106(N) communicate with each other through use of a communication service 108. The communication service 108 includes a communication manager module 110 which is executable to route messages between the communication modules 106(1)-106(N). For instance, client 102(1) may cause the communication module 106(1) to form an instant message for communication to client 102(n). The communication module 106(1) is executed to communicate the instant message to the communication service 108, which then executes the communication manager module 110 to route the instant message to the client 102(n) over the network 104. The client 102(n) receives the instant message and executes the respective communication module 106(n) to display the instant message to a respective user. In another instance, when the clients 102(1), 102(n) are communicatively coupled directly, one to another (e.g., via a peer-to-peer network), the instant messages are communicated without utilizing the communication service.

In another example, the communication service 108 may be configured to store and route email, such as through configuration as an email provider. For instance, like the previous example, client 102(1) may execute the communication module 106(1) to form an email for communication to client 102(n). The communication module 106(1) communicates the email to the communication service 108, which is then stored as one of a plurality of messages 112(h), where "h" can be any integer from one to "H", which are stored in a database 114. Client 102(n), to retrieve the email, "logs on" to the communication service 108 (e.g., by providing a client identification and password) and retrieves emails from a respective client's account. In this way, the client 102(n) may retrieve corresponding emails from one or more of the plurality of clients 102(1)-102(N) that are communicatively coupled to the communication service 108 over the network 104. Although messages configured as emails and instant messages have been described, a variety of textual and non-textual messages (e.g., graphical messages, audio messages, and so on) may be communicated via the environment 100 without departing from the sprit and scope thereof.

The message 112(h) is illustrated as including message text 116(h) and a plurality of message attachments 118(k), where "k" can be any integer from one to "K". The message attachments 118(k) may be configured in a variety of ways, such as graphics, photos, songs, files, and so on. In the following discussion, the message attachments 118(k) may be referred to as either an "attachment" or as a "message attachment". Additionally, although a plurality of attachments 118(k) is shown for the message 112(h), the message 112(h) may include a single attachment. Further, not all messages 112(h) necessarily have a corresponding attachment.

The communication manager module 110 is illustrated as including an attachment processing module 120. The attachment processing module 120 is executable to process the plurality of attachments 118(k) to generate attachment description data 122(j), where "j" can be any integer from one to "J", which is illustrated as stored in a database 124. The attachment description data 122(j) is configured to describe one or more properties of the plurality of attachments 118(k). For example, the attachment description data 122(j) may describe how many times a particular attachment 118(k) is communicated over the network 104. The attachment description data 122(j), for instance, may describe how many times a particular song, document, file, and so on, is communicated over the network 104. This attachment description data 122(*j*) may be utilized in a variety of ways.

The attachment description data 122(*j*), for instance, may indicate trends in the communication of a particular attachment 118(*k*) which may indicate whether the particular attachment 118(*k*) is a computer virus. For example, the particular attachment 118(*k*) may have first been noticed by the attachment processing module 120 on a particular day. During that day, the attachment processing module 120 may also notice that communication of the particular attachment has spread dramatically, and further, that the communication is not from a single source, but rather is being communicated by a wide variety of clients 102(1)-102(N) to each other. Additionally, the attachment processing module 120 may notice that each client 102(1)-102(N) sends a large number of messages having that attachment to a wide variety of other clients. Therefore, the attachment description data 122(*j*) may indicate that the attachment 118(*k*) may be a computer virus that is performing an "address book" attack, in which each address listed in the infected client's address book is sent a communication having an attachment that includes the computer virus.

Based on this indication, the communication manager module 110 may communicate the attachment 118(*k*) to an antivirus service 126. The antivirus service 126 includes an antivirus module 128 which is executable to generate a plurality of virus cures 130(*g*), where "g" can be any integer from one to "G", which is illustrated as stored in a database 132. The antivirus module 128, for instance, may provide a plurality of executable tools for use by a computer programmer in identifying, examining, and finding a cure for a computer virus. In another instance, the antivirus module 128 is executable to automatically examine the attachment 118(*k*) without user intervention. In this way, the communication service 108 may be utilized to inform the antivirus service 126 of "suspicious" attachments 118(*k*), and send those attachments 118(*k*) to the antivirus service 126 for further processing. The antivirus server 126, for instance, may enter into a contractual arrangement with the communication service 108 to forward any suspicious emails. Further discussion of the interaction between the communication service 108 and the antivirus service 126 may be found in relation to FIG. 3.

Although the clients 102(1)-102(N), communication service 108, and antivirus service 126 are illustrated separately, these components of the environment 100 may be rearranged, changed, combined, and further separated in a variety of ways. For example, the communication service 108 and the antivirus service 126 may be combined to form a single entity. In another example, one or more of the clients 102(1)-102(N) may incorporate the functionality of the attachment processing module 120. For example, the clients may also process attachments 118(*k*) to determine whether the attachment is a computer virus, further discussion of which may be found in relation to FIG. 5.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the attachment processing strategies described below are platform-independent, meaning that the strategies may be implemented on a variety of commercial computing platforms having a variety of processors.

Figure 2:
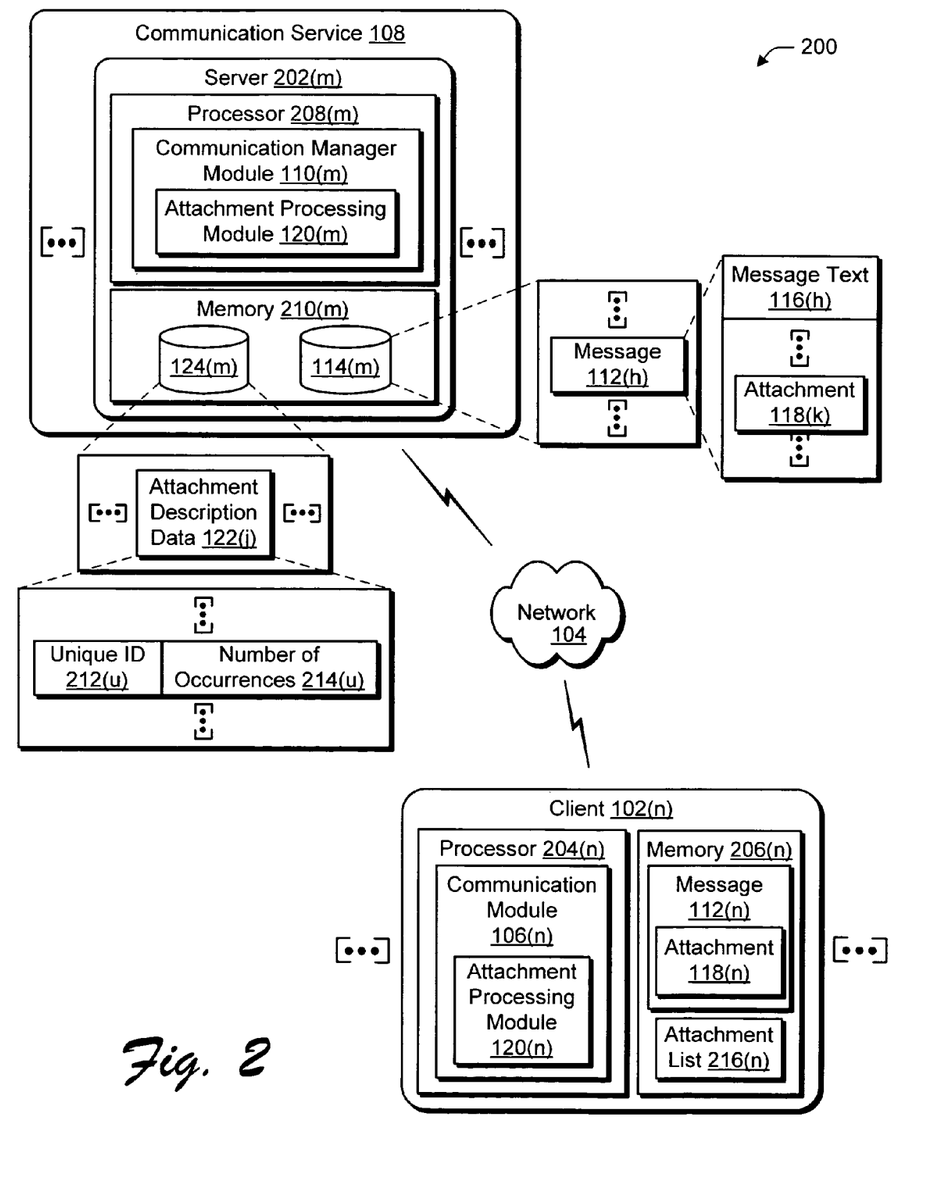
FIG. 2 is an illustration of a system in an exemplary implementation showing a plurality of clients and a communication service of FIG. 1 in greater detail.

FIG. 2 is an illustration of a system 200 in an exemplary implementation showing the plurality of clients 102(*n*) and the communication service 108 of FIG. 1 in greater detail. The system 200 of FIG. 2 is illustrated as implementing the environment 100 of FIG. 1 through use of a plurality of computing devices. For example, the communication service 108 is illustrated as being implemented by a plurality of servers 202(*m*), where "m" can be any integer from one to "M". Further, each of the plurality of clients 102(*n*) of FIG. 2 is illustrated as a client device. Accordingly, each of the plurality of clients 102(*n*) is illustrated as including a respective processor 204(*n*) and memory 206(*n*). Likewise, each of the plurality of servers 202(*m*) is illustrated as including a respective processor 208(*m*) and memory 210(*m*)

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 206(*n*) is shown for the respective client 102(*n*) and a single memory 210(*m*) is shown for the respective server 202(*m*), a wide variety of types and combinations of memory may be employed, such as random access memory (RAM), hard disk memory, removable medium memory, and so forth. For example, the database 124(*m*) which stores the plurality of attachment description data 122(*j*) may be implemented by a hard disk drive, while the database 114(*m*) which stores the plurality of messages 112(*h*) may be configured as a storage array which is accessible to the server 202(*m*). A wide variety of other instances are also contemplated.

In FIG. 2, the components of the communication service 108 of FIG. 1 (e.g., the communication manager module 110, databases 114, 124, and so on) include the parenthetical "(m)" to indicate that the communication service 108 may include a plurality of these components which are executed on and/or are available to the plurality of servers 202(*m*). For example, the communication manager module 110(*m*) is illustrated as being executed on the processor 208(*m*) and is storable in memory 210(*m*) of the server 202(*m*). The attachment processing module 120(*m*) is illustrated as being included within the communication manager module 110(*m*) to indicate that the attachment processing module 120(*m*) is accessible by the communication manager module 110(*m*). In another implementation the attachment processing module 120(*m*) may be implemented separately as a stand-alone module.

The attachment processing module 120(*m*) is executable to process each of the plurality of attachments 118(*k*) to generate the attachment description data 122(*j*) as previously described. The processing may be performed in a variety of ways to arrive at a variety of attachment description data 122(*j*). For example, the processing may be performed such that each of the plurality of attachments 118(*k*) that match, one to another, are assigned a matching one of a plurality of unique identifiers (ID) 212(*u*), where "u" can be any integer from one to "U". A variety of mathematical functions may be utilized to generating the unique IDs 212(*u*), an example of which is a hashing algorithm, further discussion of which may be found in relation to FIG. 3.

The number of occurrences 214(u) for each of the respective unique IDs 212(u) may be tracked by the attachment processing module 120(m) in the attachment description data 122(j). For example, if four attachments are processed by the attachment processing module 120(m) which contain the same data (i.e., match), the attachment description data 122(j) is assigned a single unique ID 212(u) and "four" for a number of occurrences 214(u). A variety of other techniques may also be utilized for tracking a number of occurrences for each attachment 118(k) encountered by the communication service 108

By tracking the attachments 118(k) through unique ID 212(u) and number of occurrences 214(u), the communication service 108 may detect "suspicious" attachments 118(k). For example, the communication service 108 may be configured as an email provider which processes hundreds of millions of email messages in a given day. Therefore, the email provider may be exposed to a large number of attachments 118(k) and can track matching attachments which may indicate suspicious activity, such 'as a dramatic and continuing increase in a number of messages having a matching attachment. In this way, the communication service 108 may be able to detect a potential computer virus "early" before it causes significant damage.

The client 102(n) may also incorporate similar functionality for processing attachments. For example, the communication module 106(n) is illustrated as including a respective attachment processing module 120(n), both of which are illustrated as being executed on the processor 204(n) and are storable in memory 206(n). The attachment processing module 120(n) may process an attachment 118(n) to a message 112(n) received from over the network 104 to determine if the attachment 118(n) is "suspicious", e.g., is potentially a computer virus. For instance, the attachment processing module 120(n) may process the attachment 118(n) to arrive at a unique ID in a manner similar to the unique ID 212(u) generated by the attachment processing module 120(m) of the communication service. The attachment processing module 120(n) of the client 102(n) may compare this generated unique ID with an attachment list 216(n) which includes similarly generated unique IDs (i.e., using a similar mathematical function) that are indicative of computer viruses.

If the generate unique ID matches a unique ID in the attachment list 216(n), the attachment processing module 120(n) may take a variety of actions. For example, the attachment processing module 120(n) may quarantine the attachment 118(n), delete the attachment 118(n), notify a user of the client 102(n) that the attachment 118(n) could be a computer virus, notify the communication service 108 and/or the antivirus service 126 of FIG. 1 of the attachment 118(n), and so on. Further discussion of attachment processing by the client 102(n) may be found in relation to FIG. 5.

Exemplary Procedures

The following discussion describes techniques of attachment processing that may be implemented utilizing the previously described systems and devices, as well as other systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. It should also be noted that the following exemplary procedures may be implemented in a wide variety of other environments without departing from the spirit and scope thereof.

Figure 3:
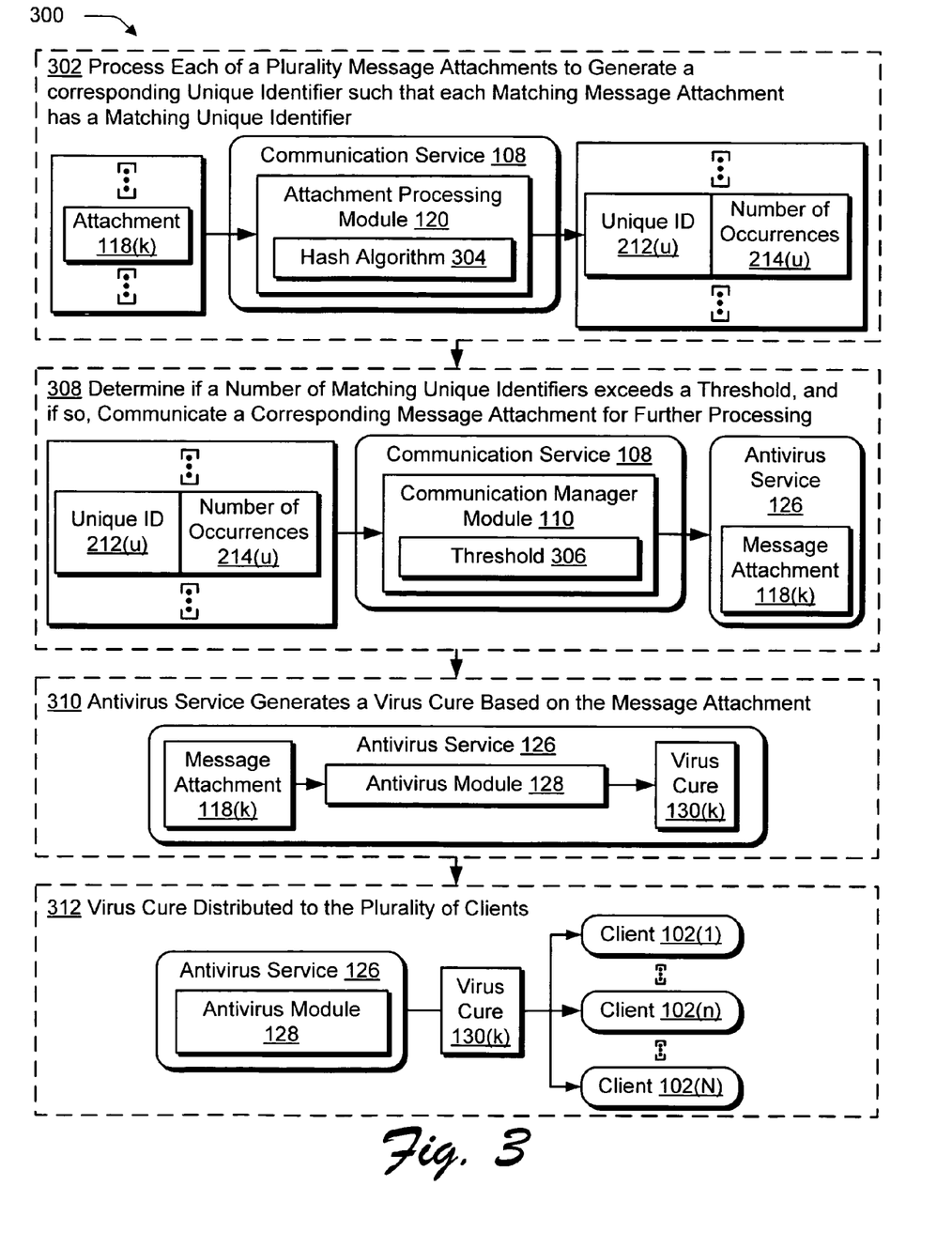
FIG. 3 is a flow chart depicting a procedure in an exemplary implementation in which a plurality of message attachments are processed to determine if a number of occurrences of the attachment exceeds a threshold, and if so, the message attachment is further processed to find a cure.

FIG. 3 is a flow chart depicting a procedure 300 in an exemplary implementation in which a plurality of message attachments are processed to determine if a number of occurrences of the attachment exceeds a threshold, and if so, the message attachment is further processed to find a cure. A plurality of message attachments is processed to generate a corresponding unique identifier such that each matching message attachment has a matching unique identifier (block 302). For example, the communication service 108 may execute an attachment processing module 120 to process the plurality of attachments 118(k) to arrive at a corresponding unique ID 212(u) for each attachment.

This processing may be performing in a variety of ways. For instance, the attachment processing module 120 may employ a hash algorithm 304. The hash algorithm 304 produces a hash value, which may be a number, generated from a string of data which forms each of the attachments 118(k). The hash value may be smaller than the string itself, and may be generated in such a way that it is unlikely that some other string will result in the same hash value. For instance, it may be generally unlikely that two different strings will produce the same hash value. However, matching strings will generally produce the same hash value. Thus, the hash value may thus supply the unique ID 212(u).

Each time a unique ID is generated which matches one to the plurality of unique IDs 212(u), a respective number of occurrences 214(u) value is incremented. Thus, each of the plurality of unique ID 212(u) may have a corresponding number of occurrences 214(u) value which describes how many times an attachment 118(k) which is suitable for generating the unique ID 212(u) has been processed by the attachment processing module 120.

A determination is then made as to whether a number of matching unique identifiers exceeds a threshold 306, and if so, a corresponding message attachment is communicated for further processing (block 308). For example, the communication manager module 110 may be executed by the communication service 108 to monitor the number of occurrences 214(u) values. If the number of occurrences 214(u) exceeds the threshold 306, the communication manager module 110 communicates a corresponding message attachment 118(k) which was used to generate the unique ID 212(u) to the antivirus service 126.

In an implementation, the communication service 108 is configured to provide the message attachment 118(k) to the antivirus service 126 for a fee. For instance, the antivirus service 126 may subscribe to the communication service 108 to receive message attachments 118(k) which exceed the threshold 306. In this way, the antivirus service 126 may obtain an "early warning" regarding suspicious message attachments 118(k).

The antivirus service may then generate a virus cure 130(k) based on the message attachment (block 310). For example, the antivirus service 126 may execute an antivirus module 128 that includes one or more tools which help a software engineer to examiner the message attachment 118(k) and determine how to disable the message attachment 118(k). For instance, the software engineer, through execution of the antivirus module 128, may detect a vulnerability in an application module and determine a "fix" for the vulnerability, which is therefore also the "cure" for the virus, i.e., virus cure 130(k). The virus cure 130(k) is then distributed to the plurality of clients 102(1)-102(N) (block 312). Thus, in this example, the antivirus service 126 is providing with an early indication of a suspicious message attachment as a result of the monitoring performed by the communication manager module 110 on the large number attachments, to which, the communication service 108 is exposed.

Figure 4:
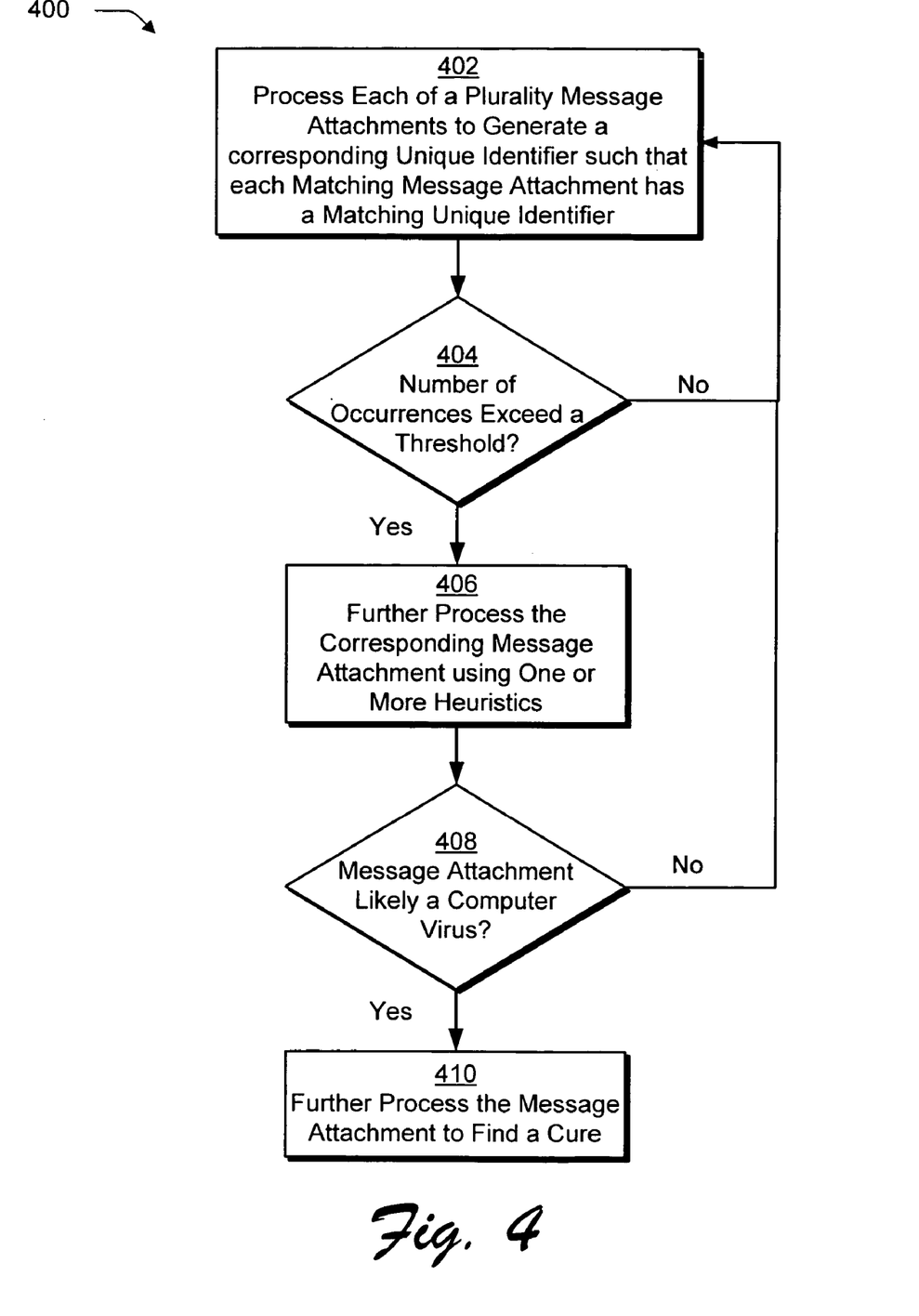
FIG. 4 is a flow diagram depicting a procedure in an exemplary implementation in which different hierarchical levels of processing are performed on a message attachment.

FIG. 4 is a flow diagram depicting a procedure 400 in an exemplary implementation in which different hierarchical levels of processing are performed on a message attachment. As before, each of a plurality of message attachments is processed to generate a corresponding unique identifier, such that each matching message attachment has a matching unique identifier (block 402).

A determination is made as to whether a number of occurrences of one or more of the message attachments exceed a threshold (block 404). For example, the communication manager module 110 may monitor the number of occurrences generated by the attachment processing module 120. If the number does not exceed the threshold ("no" from decision block 404), the processing of the message attachments continues.

When the number of occurrences does exceed the threshold ("yes" from decision block 404), the corresponding message attachment is further processed using one or more heuristics (block 406). For example, the communication service 108 may determine an average number of messages sent from each client that sent the message attachment 118(k) that include the message attachment 118(k). For example, if each client sends a relatively large number of messages that contain the attachment, the attachment may be configured as a virus that performs an "address book" attack as previously described. A variety of other heuristics may also be utilized, such as time of day the messages are sent that include the attachment, whether a trend (e.g., rate) in the number of messages which include the message attachment is increasing, type of message attachment, and so on. Thus, the heuristics may be utilized to determine whether it is likely that the message attachment is a computer virus (decision block 408).

If the message attachment has a likelihood of being a computer virus ("yes" from decision block 408), the message attachment is further processed to find a cure (block 410). For example, the communication service 108 may forward the message attachment to an antivirus service for finding a cure. In another example, the antivirus service performs the processing using the heuristics, and therefore determines whether a cure is needed.

Therefore, in this exemplary implementation, different hierarchical processing levels were employed to first determine which of the plurality of message attachments, if any, were suspicious based on a threshold. The suspicious message attachments were further processed based on heuristics to determine whether the message attachment likely includes a virus. The message attachments which are likely to include a virus are further processed to find a cure. In this way, the resources of the communication service 108 and the virus service 126 may be assigned to process a very large number of message attachments (e.g., millions and millions) to provide early detection and processing of computer viruses. Although three hierarchical levels were described in this example, more or fewer hierarchical level may also be utilized without departing from the spirit and scope thereof.

Figure 5:
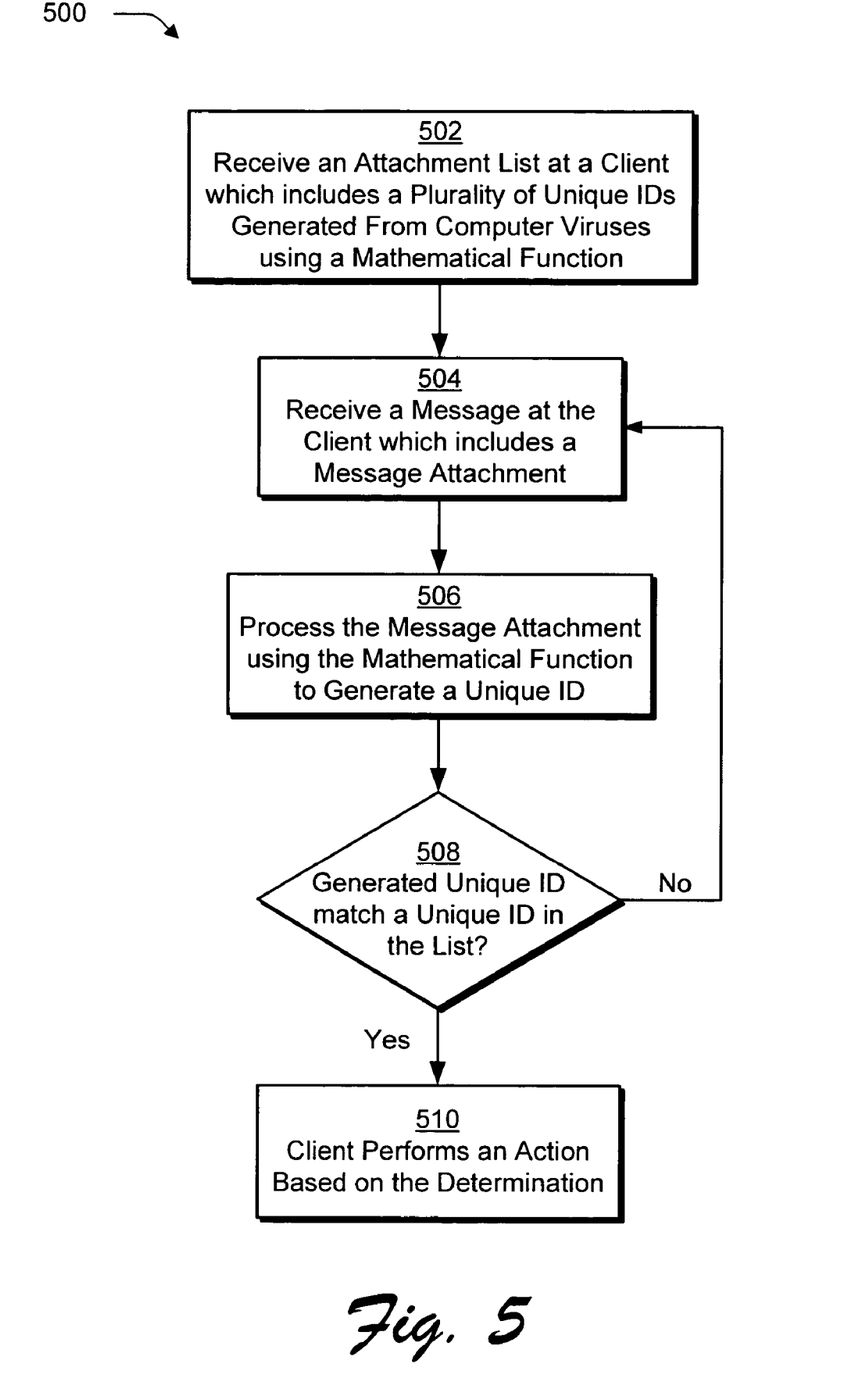
FIG. 5 is a flow diagram depicting a procedure in an exemplary implementation in which a client compares a unique ID generated from a messages attachment with an attachment list of unique IDs to determine if the messages attachment is a computer virus.

FIG. 5 is a flow diagram depicting a procedure 500 in an exemplary implementation in which a client compares a unique ID generated from a message attachment with an attachment list of unique IDs to determine if the message attachment is a computer virus. An attachment list is received at a client which includes a plurality of unique IDs generated from computer viruses using a mathematical function (block 502). For example, the communication service 108 and/or the antivirus service 126 may employ a hash algorithm on the content of each of a plurality of computer viruses to arrive at a corresponding plurality of unique IDs (i.e., hash values) to form an attachment list 216(n). This attachment list 216(n) may then be communicated to the client 102(n) over the network 104.

The client receives a message which includes a message attachment (block 504). For example, the client may receive an instant message which includes a message attachment which appears as a music file. In another example, the client may receive an email message which contains a message attachment that appears to be a video file.

The client processes the message attachment using the mathematical function to generate a unique ID (block 506). For example, the client may process the received message attachment using the same hash algorithm that was utilized by the communication service 108 and/or the antivirus service 126 to generate the attachment list 216(n).

A determination is then made as to whether the generated unique ID matches a unique ID in the list (decision block 508). If so ("yes" from decision block 510), the client performs an action based on the determination (block 510). For example, the client may quarantine the message and the message attachment in a quarantine folder, the client may delete the message attachment, may forward the message attachment to the antivirus service 126 for processing, may forward data describing receipt of the message attachment (but not the message attachment itself) to the antivirus service and/or the communication service 108, and so on. A variety of other examples are also contemplated.

Conclusion

Although the invention has been described in language specific to structural features and/or methodological acts, it is to be understood that the invention defined in the appended claims is not neccessarily limited to the specific features or acts described. Rather, the specific features and acts are disclosed as exemplary forms of implementing the claimed invention.

What is claimed is:

1. A method comprising:
    processing each of a plurality of message attachments to generate a corresponding unique identifier such that each said message attachment that matches, one to another, has a matching said unique identifier; and
    determining if a number of matching said unique identifiers exceeds a threshold, and if so, communicating a corresponding said message attachment for further processing,
    wherein the processing and the determining are performed through execution of one or more modules on a server that is configured to communicate a message having the corresponding said message attachment to a client to which the message is addressed.

2. A method as described in claim 1, wherein the processing is performed using a hashing algorithm.

3. A method as described in claim 1, wherein the further processing includes ascertaining whether the corresponding said message attachment is a computer virus by utilizing heuristics.

4. A method as described in claim 1, wherein at least one message which has a corresponding said message attachment is configured as an email message or an instant message.

5. A method as described in claim 1, wherein the threshold is defined using a rate.

6. A method as described in claim 1, further comprising communicating the corresponding said message attachment over a network to an entity that is configured to provide payment for receipt of the corresponding said message attachment.

7. A method comprising:

determining if a number of matching unique identifiers exceed a threshold, wherein each said matching unique identifier is representative of a matching message attachment, and wherein the determining is performed through execution of one or more modules on a server that is configured to communicate a message having the matching message attachment to a client to which the message is addressed; and when the number exceeds the threshold, ascertaining whether the matching message attachment is a computer virus.

8. A method as described in claim 7, wherein a message which has the matching message attachment is configured as an email message or an instant message.

9. A method as described in claim 7, wherein the threshold is defined using a rate.

10. A method as described in claim 7, wherein the ascertaining is performed by an entity that is configured to provide payment for receipt of the matching message attachment.

11. A method as described in claim 7, further comprising computing each said unique identifier using a hashing algorithm.

12. A method comprising:

computing a unique identifier for a message attachment;

comparing the unique identifier with a plurality of other unique identifiers to find a match, where one or more of the plurality of other unique identifiers correspond to a computer virus; and processing the message attachment to remove a computer virus from a corresponding said message having the message attachment when the match is found, wherein the computing and the comparing are performed through execution of one or more modules on a server that is configured to communicate a message having the message attachment to a client to which the message is addressed, wherein the message is an email or an instant message.

13. A method as described in claim 12, wherein each said unique identifier is computed utilizing a corresponding mathematical function that match, one to another.

14. A method as described in claim 13, wherein the mathematical function is a hashing algorithm.

* * * * *